United States Patent [19]

Ishiyama

[11] Patent Number: 5,244,609

[45] Date of Patent: Sep. 14, 1993

[54] PROCESS FOR PREPARING AN IMPERMEABLE CARBON FIBER REINFORCING TYPE OF COMPOSITE MATERIAL

[75] Inventor: Shintaro Ishiyama, Tokai, Japan

[73] Assignee: Japan Atomic Energy Research Institute, Tokyo, Japan

[21] Appl. No.: 799,199

[22] Filed: Nov. 27, 1991

[30] Foreign Application Priority Data

Nov. 28, 1990 [JP] Japan .................................. 2-323335

[51] Int. Cl.$^5$ ............................................ C04B 35/52
[52] U.S. Cl. .................................. 264/29.5; 264/29.6; 264/29.7; 264/85; 264/101; 264/325; 425/405.2
[58] Field of Search .................... 264/29.1, 29.5, 29.2, 264/29.7, 29.6, 85, 316, 101, DIG. 19, 235, 237, 346, 348, 500, 571, 325; 425/405.1, 405.2

[56] References Cited

U.S. PATENT DOCUMENTS

| | | |
|---|---|---|
| 4,668,579 | 5/1987 | Strangman et al. |
| 4,822,538 | 4/1989 | Yoshida et al. ................ 264/29.5 |
| 5,009,823 | 4/1991 | Kromrey ......................... 264/29.7 |
| 5,022,343 | 6/1991 | Fujikawa et al. ................ 264/29.5 |
| 5,057,254 | 10/1991 | Sohda et al. .................... 264/29.5 |
| 5,114,635 | 5/1992 | Sohda et al. .................... 264/29.5 |

FOREIGN PATENT DOCUMENTS 335736 10/1989 European Pat. Off.

*Primary Examiner*—Jeffery Thurlow
*Assistant Examiner*—Mathieu Vargot
*Attorney, Agent, or Firm*—Oblon, Spivak, McClelland, Maier & Neustadt

[57] ABSTRACT

A process for preparing an impermeable carbon fiber reinforcing deposit material including placing a preformed carbon fiber material and an impregnating material of pitch or heat-resistant glass or mixtures thereof into a heat-resistant capsule; placing said capsule into a pressing container; heating the mixture to the melt temperature of the impregnating material under pressure of an inert gas; after maintaining temperature for a given time reducing the temperature and pressure; subsequently, raising the temperature gradually while maintaining the reduced pressure; after heating to a maximum temperature, maintaining said maximum temperature at the reduced pressure for a given time; then injecting an inert gas to raise the pressure to a given value; and, after maintaining the pressure for a given time, reducing both the pressure and the temperature.

14 Claims, 2 Drawing Sheets

PROCESS FOR PREPARING AN IMPERMEABLE CARBON FIBER REINFORCING TYPE OF COMPOSITE MATERIAL

BACKGROUND OF THE INVENTION (a) Field of the Invention

The present invention relates to a process for preparing an impermeable carbon fiber reinforcing type of composite material.

More particularly, the present invention relates to a process for preparing an impermeable type of composite material reinforced with carbon fiber by an isostatic hot pressing process using a refractory capsule.

(b) Description of the Prior Art

The prior impermeable graphite material has been prepared by, after impregnating a graphite with pitch, glass, synthetic resin by a cold pressing process, repeating a graphitization treatment.

However, such prior process requires a great deal of trouble and time for impregnating treatment and cannot be conducted at a high temperature of above 800° C. and also cannot be done under high pressure since it is not reinforced with carbon fiber, etc. and thus the process has many problems for applying it to a structural material and members thereof.

Moreover, since graphite which is a starting material is made by another method, it requires a great deal of trouble and time to the final product because carbonization and graphitization treatments are held separately for preparing special material and so the price of product tends to go up.

SUMMARY OF THE INVENTION

An object of the present invention is to provide a process for preparing an impermeable carbon fiber reinforcing type of composite material, in which such problems have been solved.

That is, the present process is a process for preparing an impermeable carbon fiber reinforcing type of composite materials, which aims at the following points for solving the problems of the prior art:

(1) the product can resist a temperature of at least above 800° C., 3000° C. at the highest as a high temperature impermeable material;

(2) the product can resist a temperature of 3000° C. at the highest and a pressure of 40 atm. at the highest; and (3) the impermeation, carbonization and graphitization treatments can be conducted simultaneously and for a short time and so manufacturing expense is comparatively cheap.

1 preformed material;
2 container for hot isostatic pressing process;
3 capsule;
4 impregnating material.

Figure 2:
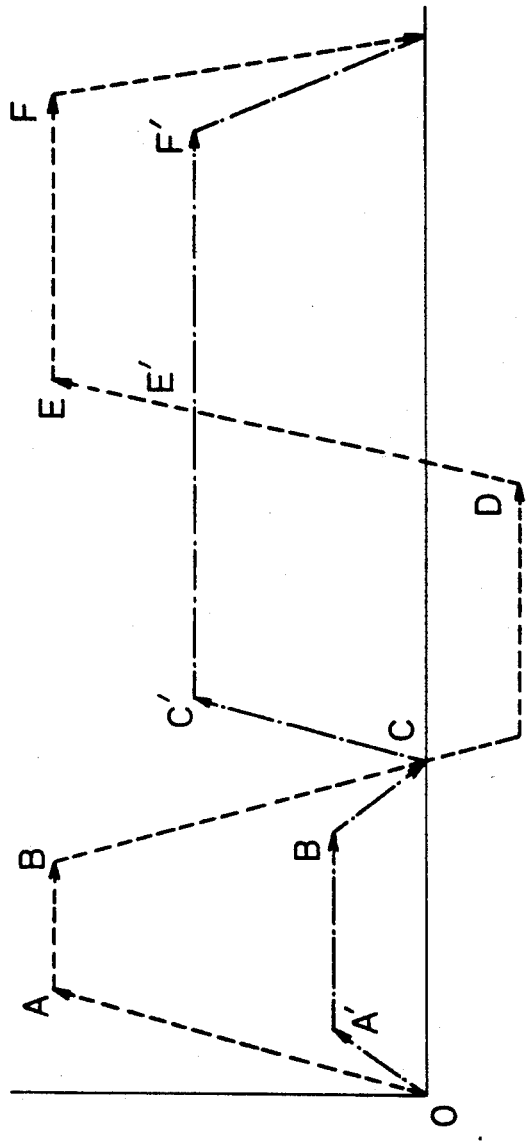

FIG. 2 is a graph for showing a process of high temperature isostatic press treatment.

In the figure:

Abscissa is lapse of time and ordinate is pressure and temperature; and

Dotted line shows history of pressure and broken line shows history of temperature.

DESCRIPTION OF THE PREFERRED EMBODIMENT

As the result of applying himself to research for attaining this object, the present inventor is struck an idea of conducting the impermeation, carbonization and graphitization treatments consistently by applying an isotactic hot pressing process to preformed material using pitch, heat-resistant glass and mixtures thereof as an impregnating material, and, on the basis of this knowledge, has come to invent a process for preparing an impermeable carbon fiber reinforcing type of composite material which comprises the steps:

vacuum sealing preformed material comprising carbon fiber together with an impregnating material comprising pitch or heat-resistant glass or mixtures thereof into a capsule comprising a heat-resistant material, or charging them thereinto in the open state;

placing said capsule into a pressing container;

heating it to a melt temperature of said impregnating material under pressure of inert gas;

after maintaining the temperature for a given time, reducing the temperature and pressure;

next, raising the temperature gradually while maintaining the reduced pressure, and, after heating to the highest temperature, maintaining said highest temperature at the reduced pressure for a given time; and then injecting an inert gas thereinto to a given pressure, and, after maintaining the pressure for a given time, releasing the inert gas to reduce the pressure while lowering the temperature.

Further, the present process for preparing an impermeable carbon fiber reinforcing type of composite material will be explained concretely.

Figure 1:
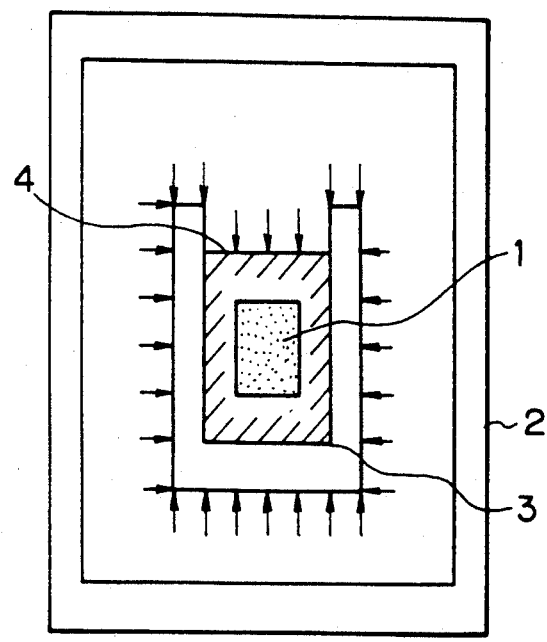
FIG. 1 is a figure for illustrating the high temperature isostatic press treatment in the present invention.

As shown in FIG. 1, a preformed material 1 comprising carbon fiber is vacuum sealed into a capsule 3 comprising a heat-resistant material together with an impregnating material 4 comprising pitch or heat-resistant glass or mixtures thereof, or charged in the open state, and then said capsule 3 is placed into a pressing container 2.

The quality of capsule 3 is selected according to the expected treating temperature, for example vanadium is selected for the highest temperature to 2000° C. and a dense film or sheet material of graphitized polymer or dense C/C (graphite-carbon) material or graphite material is selected for the highest temperature of 3000° C.

The preformed material 1 and impregnating material 4 charged in the capsule 3 are applied a hot isostatic pressing process according to the following temperature and pressure conditions, as shown in FIG. 2.

Temperature Condition

The treatment condition is established according to the object of final product. Herein the case of 3000° C. as the highest temperature will be shown.

First, the impregnating material is heated to its melting point to be melted (O–A′–B′).

The temperature is once reduced together with the pressure (B′–C). Herein the maintaining time is made to above 1 hour.

Next, it is heated as gradually as possible with the rate of temperature increase of below 1000° C./hour (C–C′), and then, after reaching the object temperature of 3000° C., the temperature is maintained (C′–F).

Thereafter, it is gradually cooled with the cooling velocity of below 100° C./hour (F′–G).

Pressure Condition

The pressure of argon gas injected into the treating furnace is made 2000 atm to make the structure of preformed material dense mechanically (O-A-B-C).

After reaching the highest pressure, the pressure is maintained at least for 1 hour.

Next, the pressure is once reduced and further the interior of furnace is vacuumed to about $10^{-3}$ Torr to encourage the release of gas produced from the treating product and impuities (C-D). At that time the vacuum is maintained at least for above 1 hour (C-D).

Next, argon gas is injected again with pressure into the furnace to reach the expected pressure (D-E). In this case the highest pressure is 2000 atm.

After maintaining it for a given time (E-F), argon gas is released according to the decrease of temperature to reduced the pressure (F-G).

The above temperature and pressure conditions are simultaneously applied to complete one cycle.

This cycle is repeated as occasion calls.

According to the present invention the development of refractory material used for structures of heat exchanger and first wall of fission reactor as well as space shuttle which are operated under an inert environment of 3000° C. and above 40 atm has become possible. Moreover, since the densification, carbonization and graphitization can be simultaneously conducted in the manufacturing process, the shortening of manufacturing time and the reduction of cost are possible.

The present invention makes possible the development of impermeable refractory structural material which can resist a super high temperature as 3000° C. and thereby the utilization as a structural material in the fields of energy, space, aviation, ocean and others is possible.

And, since the densification, carbonization and graphitization can be simultaneously conducted, the manufacturing can be done for shorter time and lower cost than in the prior art.

What is claimed is:

1. A process for preparing an impermeable carbon fiber reinforcing composite material which comprises the steps:

vacuum sealing a preformed material, comprising carbon fiber, together with an impregnating material, comprising pitch or heat-resistant glass or mixtures thereof, into a capsule comprising a heat-resistant material, or charging said preformed material and said impregnating material thereinto;

placing said capsule into a pressing container;

heating it to a melt temperature of said impregnating material under pressure of inert gas;

after maintaining the temperature for a given time, reducing the temperature and pressure;

next, raising the temperature gradually while maintaining the reduced pressure, and, after heating to a maximum temperature, maintaining said maximum temperature at the reduced pressure for a given time;

and then injecting an inert gas thereinto at a given pressure, and, after maintaining the pressure for a given time, releasing the inert gas to reduce the pressure while lowering the temperature.

2. The process as set forth in claim 1 wherein the steps are repeated as one cycle.

3. The process as set forth in claim 1 wherein said inert gas is helium.

4. The process as set forth in claim 1 wherein said inert gas is argon.

5. The process as set forth in claim 1, wherein the capsule is made of vanadium when the maximum temperature is 2,000° C.

6. The process as set forth in claim 1, wherein the capsule is made of a dense film or sheet material constructed from at least one material selected from the group consisting of dense C/C (graphite-carbon) material and graphite material, when the maximum temperature is 3,000° C.

7. A process for preparing an impermeable carbon fiber reinforcing composite material which comprises the steps:

vacuum sealing a preformed material, comprising carbon fiber, together with an impregnating material, comprising pitch or heat-resistant glass or mixtures thereof, into a capsule comprising a heat-resistant material, or charging said preformed material and said impregnating material thereinto;

placing said capsule into a pressing container;

heating it to a melt temperature of said impregnating material under pressure of inert gas;

after maintaining the temperature for a given time, reducing the temperature and reducing the pressure below atmospheric pressure;

next, raising the temperature gradually while maintaining the reduced pressure, and, after heating to a maximum temperature, maintaining said maximum temperature at the reduced pressure for a given time;

and then injecting an inert gas thereinto at a given pressure, and, after maintaining the pressure for a given time, releasing the inert gas to reduce the pressure while lowering the temperature.

8. The process as set forth in claim 7, wherein the steps are repeated as one cycle.

9. The process as set forth in claim 7, wherein said inert gas is helium.

10. The process as set forth in claim 7, wherein the inert gas is hydrogen.

11. The process as set forth in claim 7, wherein the capsule is made of vanadium when the maximum temperature is 2,000° C.

12. The process as set forth in claim 7, wherein the capsule is made of a dense film or sheet material constructed from at least one material selected from the group consisting of dense C/C (graphite-carbon) material and graphite material, when the maximum temperature is 3,000° C.

13. The process as set forth in claim 6 wherein the graphite material comprises graphitized polymer.

14. The process as set forth in claim 12 wherein the graphite material comprises graphitized polymer.

* * * * *